Dec. 22, 1959 F. A. WERSTEIN 2,918,290
CHUCK AND ADAPTER FOR SELF-DRILLING EXPANSION SHELLS
Filed Sept. 3, 1957 3 Sheets-Sheet 2
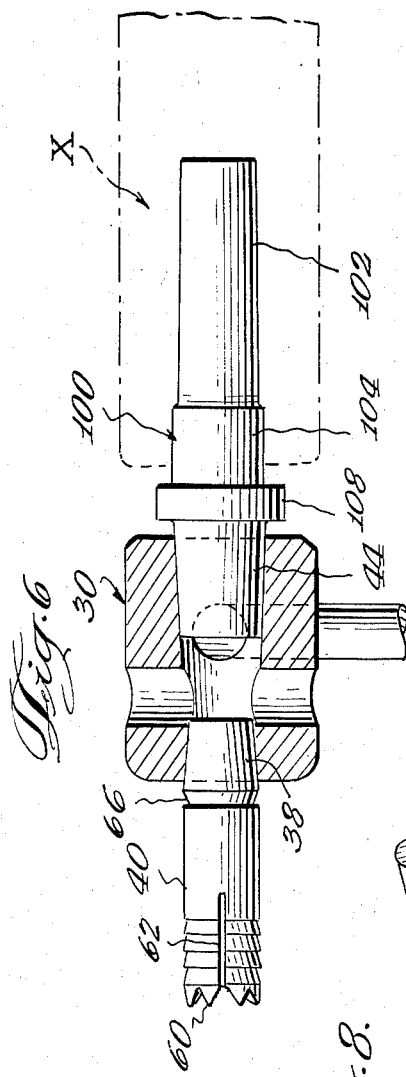
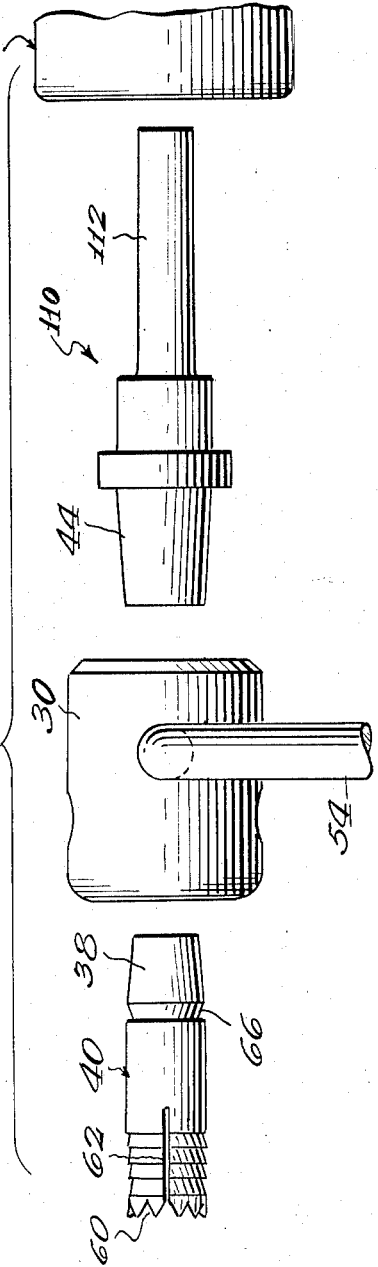
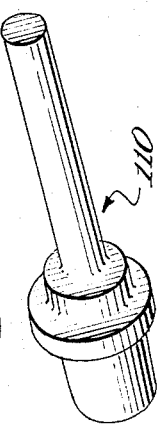
Inventor
Frank A. Werstein
By
Attorneys

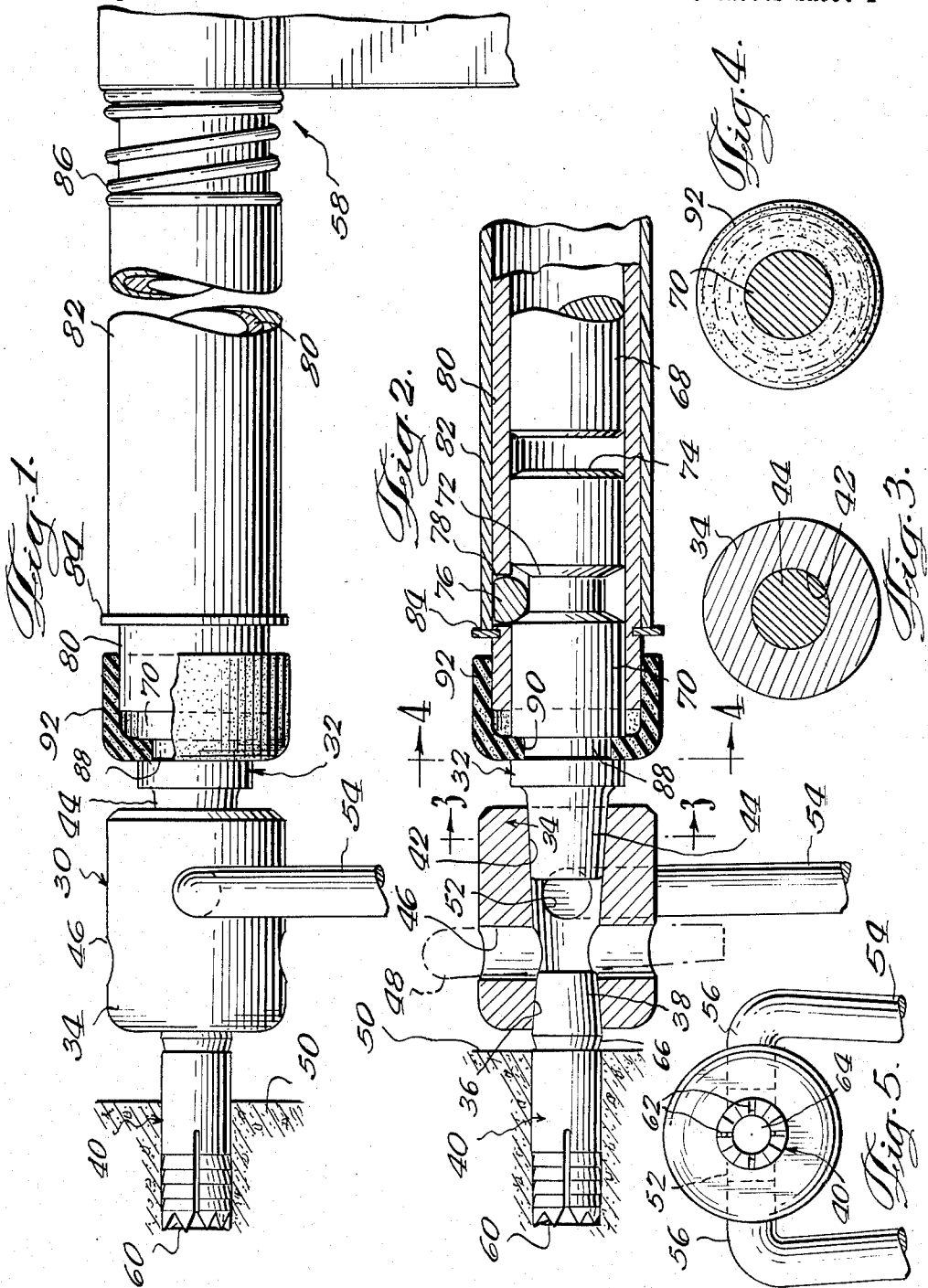

Dec. 22, 1959 F. A. WERSTEIN 2,918,290
CHUCK AND ADAPTER FOR SELF-DRILLING EXPANSION SHELLS
Filed Sept. 3, 1957 3 Sheets-Sheet 3
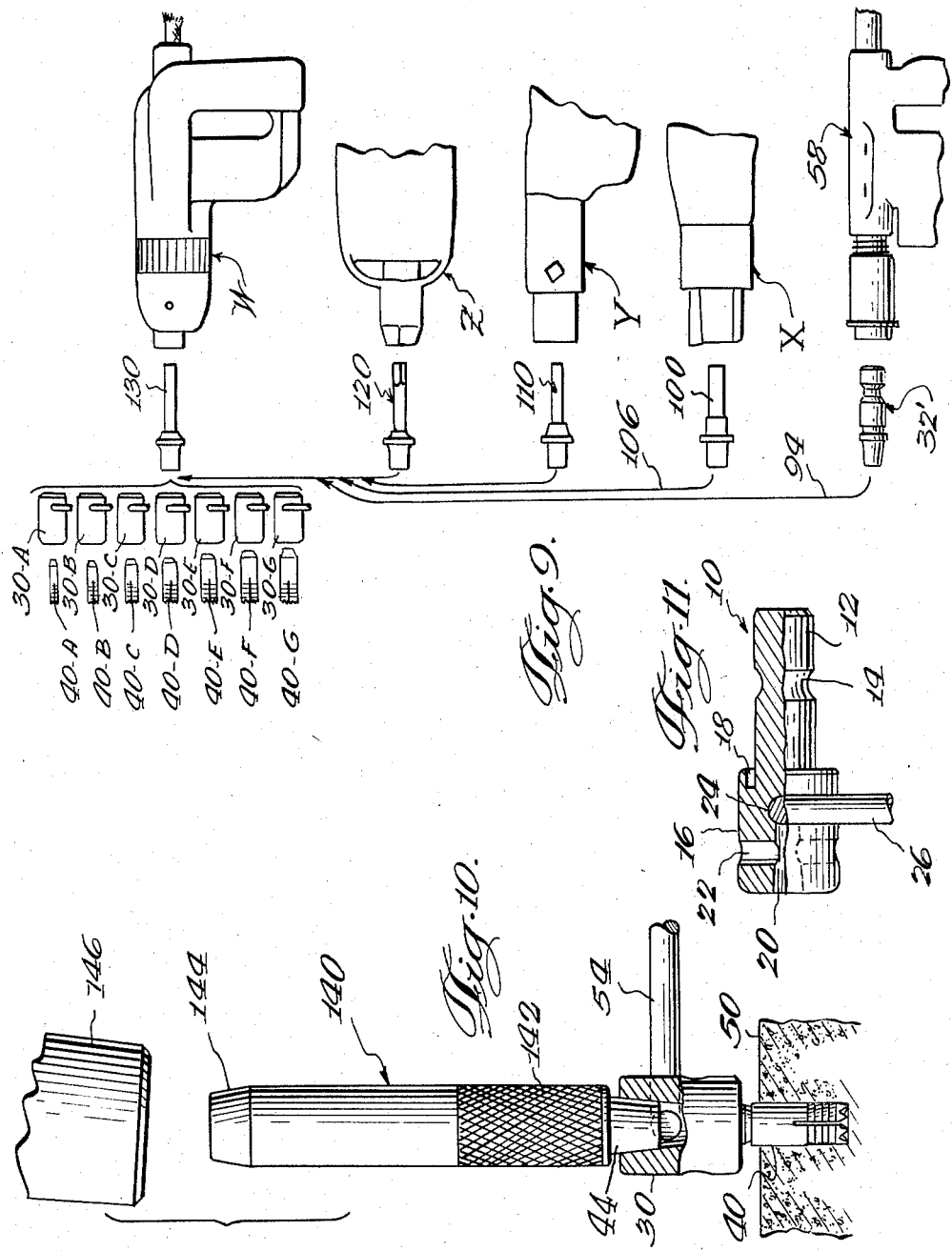
Inventor
Franck A. Werstein
By
Attorneys United States Patent Office 2,918,290
Patented Dec. 22, 1959

2,918,290

CHUCK AND ADAPTER FOR SELF-DRILLING EXPANSION SHELLS

Frank A. Werstein, Long Beach, Ind.

Application September 3, 1957, Serial No. 681,689

12 Claims. (Cl. 279—19)

This invention relates generally to holders for self-drilling expansion shells whereby the shells may be installed, and more particularly is concerned with a novel holder or chuck and adapter for enabling the holder or chuck to be used with many different types of equipments.

The so-called self-drilling expansion shell with which the invention herein is concerned principally comprises a hollow cylindrical member having sharp axially directed teeth at one end and having its opposite end tapered to enable the member to be mounted in a socket provided in a chuck. Axially extending grooves are provided on the shell body at the toothed end to enable the expansion of the shell in the installation of the same. The tapered portion may have a circumferential groove spaced from its end so that the tapered portion may be broken off by lateral strain after installation, to enable the shell to remain flush in the masonry. Shells of this construction are shown and described in U.S. Patent 1,996,121. Tapered end shells are shown and described also in U.S. Patents 1,746,050 and 1,621,598.

The shells are installed in masonry, concrete or stone by percussion. The chuck is mounted on the operative end of a pneumatic, electric or mechanical hammer, the shell inserted in the chuck and the shell is engaged against the masonry while the hammer delivers its blows. The shell teeth drill a hole in the masonry and the debris and cuttings pass through the hollow center of the shell and out of a passageway provided in the chuck. The passageway is for ejection of the shell by means of a suitable tool in a manner shown in U.S. Patent 1,786,029. While the hole is being drilled, the entire chuck is rocked or oscillated back and forth about the axis of the shell through the use of a bail or handle which is rotatively journalled in the chuck. A chuck such as described is illustrated in U.S. Patent 2,767,988 and in U.S. Patent 1,968,055, both of the latter two patents illustrating one type of electric hammer which may be used to install these self-drilling shells.

After the hole has been drilled, the shell is withdrawn and the hole cleaned. Thereafter a tapered plug is inserted in the toothed end, the shell re-inserted in the hole and hammered home. The tapered plug spreads the toothed end by splitting same along the fracture grooves, expanding the shell within the hole, causing the teeth to bite laterally into the walls of the hole, and permanently securing the shell within the hole. Thereafter, the shell is ejected from the chuck by some suitable tool, or its tapered end may be broken off and the broken off end later forced out of the chuck.

There are a great many constructions for percussive hammers, each of which has heretofore required a different kind of chuck. Furthermore there are numerous sizes of shells, each also requiring a different size socket in the chuck for holding the same. Thus, the user who had a particular structure of hammer had to purchase and carry with him as many chucks as he had different sizes of shells to install. Of course, where the user limited his work to only one size of shell this did not pose much of a problem. The distributor, or manufacturer on the other hand, had a very acute problem, which until the advent of this invention, has never been solved. It was necessary to stock and/or manufacture as many different chucks as types of hammers, and for each type of chuck, as many additional sizes of shells. The trade now utilizes seven sizes of these shells, and there are well over 30 different kinds of percussion hammers on the market in the United States. In order to have a complete line, the manufacturer must be able to supply hundreds of different chucks, each representing an independent tooling and set-up for manufacture as well as independent stock numbers, storage bins, storage facilities, etc.

The principal object of this invention is to completely eliminate the problems above referred to and thereby achieve greater economy for the distributor and manufacturer.

The invention is carried out by forming the integral chuck as heretofore known, of two cooperating parts, one of which is adapted to be carried by the hammer, and the other of which is adapted to receive the shell therein. The parts will be referred to herein as the adapter and tool holder respectively. The tool holder and adapter are engaged together by providing one of them with a tapered male end and providing the other with a tapered female socket so that a firm engagement is achieved when the male end is seated in the socket. The cooperative elements of all adapters and all tool holders are made identical so that the manufacturer need make only one adapter for each kind of hammer with which the shells are to be installed, and one tool holder for each size of shell. Thus, assuming that the line of chucks manufactured and stocked by the manufacturer was intended to be used on thirty five different kinds of hammers and seven sizes of shells were to be accommodated, he was required to manufacture 245 different chucks prior to this invention. Where the structures are formed in accordance with the teachings of the invention, the manufacturer is only required to make thirty five adapters, and seven tool holders, or a total of 42 pieces.

An important object of the invention is concerned with the provision of a structure comprising separate tool holders and adapters to be operatively associated as described hereinafter.

Several important advantages are achieved through the invention which are totally unobvious and were not heretofore achieved. Expansion shells of the type described herein could not previously be installed by manual methods beacuse it was difficult to hold the shell and furthermore, prior structures for holding shells could not be made with provision to remove the debris and cuttings as the hole was being drilled. With the invention herein, instead of using the tool holder with an adapter, a hand held bar with a tapered end is readily inserted into the female socket and can be manually hammered to drive the shell into the masonry. The tool holder has the central opening and communication with the ejector holes to enable the debris to work its way out while the hole is being drilled. Thus, the same tool holders which are used with adapters for fitting percussive hammers are also suitable for use in manually affixing the shells. The handle may be removed for manual use.

Another advantage resulting from the invention is also concerned with economy and ease of fabrication. The chuck as previously known and made integral, had to be formed of metal stock the minimum diameter of which was equal to or greater than the diameter of the thickest portion. The thickest portion is at the end of the tool holder. The portions of previous chucks which fitted into their respective hammers were invariably substantially less in diameter than the portions which receive the shell. This resulted in great waste of material which had to be cut away when making a chuck. An important object of the invention is to achieve the saving which is occasioned by the fact that the adapters are made of stock which has considerably lesser diameter than the stock from which the tool holders are made.

Still a further advantage over previous structures is the fact that difficult and expensive undercuts in some chucks have been eliminated by the invention resulting in additional savings to the manufacturer. Such undercuts have been necessary in order to provide protection for the hammer from the stone dust and debris, and were in the larger diameter portion which, according to this invention, comprises the tool holder. If it is necessary to provide overhang, the end of the tool holder is more readily drilled or milled out than if there were an integral shank interfering with the forming tools.

Many additional objects and advantages accrue from the invention as those skilled in the art will appreciate as the invention is more fully described hereinafter. In connection with such decription the details of preferred forms have been set forth as required by the patent law in order especially to point out wherein a substantial advance has been made in the arts and sciences. Certain diagrams and drawings accompany this description illustrating the preferred forms, but this is not intended to limit the structures which are encompassed in the scope of the invention.

In the drawings:

Fig. 1 is a side elevational view of a chuck and adapter constructed in accordance with the invention associated with a percussive hammer and having a self-drilling expansion shell seized therein, portions being shown in section.

Fig. 2 is a similar view, but illustrating the same in section, and in this view the shell has been fully driven into the masonry. In this as well as the previous view, only a fragmentary portion of the hammer is shown.

Figs. 3 and 4 are transverse sectional views taken along the lines 3—3 and 4—4 respectively of Fig. 2 and in the indicated direction.

Fig. 5 is an end-on elevational view of the chuck and adapter taken from the left hand end of Fig. 1.

Fig. 6 is a sectional view taken through a tool holder of the same structure as that of Figs. 1 and 2 but illustrating the same associated with a different form of adapter.

Fig. 7 is an exploded elevational view of the parts similar to those shown assembled in Fig. 6, but with a somewhat different form of adapter.

Fig. 8 is a perspective view of the adapter of Fig. 7.

Fig. 9 is a diagrammatic view showing how different hammers require different adapters, but all tool holders fit all adapters.

Fig. 10 is an elevational view, partly in section illustrating how a tool holder is utilized to install a self-drilling shell manually, that is, with the use of a common hammer.

Fig. 11 is an elevational view, partially in section to show a chuck of previous construction, comprising prior art.

It is again pointed out that the combined structure of the tool holder and adapter is referred to herein as a chuck and adapter when spoken of together, but where referred to separately the parts will be called tool holder and adapter.

Reference is first made to the chuck 10 in Fig. 11 which is a structure heretofore used. Such a chuck has a shank or stem portion 12 which is inserted into the percussive hammer with which the same is to be used. The particular structure which includes the annular groove 14 is especially intended for use with the electric hammers illustrated in U.S. Patent 1,968,055 and U.S. Patent 2,767,988.

The shank 12 is integral with an enlarged diameter head 16 the end of which has an undercut groove 18 which is intended to telescope over the end of the hammer to prevent the admission of dust into the hammer. The head has an axial tapered socket 20 opposite the shank 12 to receive the self-drilling shell, and the socket communicates with a transverse passageway 22 which is for the purpose of permitting debris and cuttings drilled out of the hole formed by the shell to be worked out, and for the additional purpose of admitting an ejector tool. Spaced axially rearward of the passageway 22 is another transverse passageway 24 preferably at right angles to passageway 22 into which is journalled the facing ends of a looped rod forming a handle or bail 26 used to oscillate or swing the chuck 10 as the drilling operation proceeds.

The chuck 10 is a typical structure, there being similar structures for different sizes of shells which differ from the chuck illustrated by difference in the size of socket 20. There are other structures which are identical except for the formation of the shank 12, and the inclusion of different forms of the undercut groove 18 or perhaps the exclusion of the groove entirely, for association with different kinds of hammers. As previously explained, it is necessary for the manufacturer to make, and the distributor to stock a quantity of chuck types which is measured by the product of the number of types of hammers used by customers by the number of sizes of shell.

Figs. 1 and 2 best illustrate the structure of the invention. Instead of an integral chuck as 10, there are formed two parts, namely a tool holder 30 and an adapter 32. The tool holder comprises a cylindrical member 34 having one end, the left in the figures, provided with an axial socket 36 of such dimensions to receive the tapered end 38 of a self-drilling shell 40 of a predetermined size. The right hand end of the cylindrical member has another socket 42 of tapered formation, so dimensioned to receive the male tapered end 44 of the adapter 32.

The tool holder is also provided with a transverse passageway 46 which passes completely through the cylindrical member 34 and is intended to receive the ejector tool shown in fragmentary broken outline 48 in Fig. 2. Note that the tapered end 38 extends partially into the passageway 46 so that if the ejector tool 48 has a thickness approximately that of the passageway 46 but is provided with a flat portion disposed opposite the end 38, rotation of the ejector tool will wedgingly disengage and force the end 38 out of its socket 36. Since the self-drilling shell is hollow, as it is hammered and drilled into the masonry 50 the stone dust and debris will work its way through the center of the shell 40 and out of the rear thereof through the passageway 46.

Another transverse passageway 52 is formed in the cylindrical member 34 preferably at a right angle to the passageway 46. A bail or handle 54 is journalled in this transverse passageway. The passageway 52, in function, is the same as attributable to aligned sockets formed on opposite sides of the cylindrical member 34. This is because, as shown in Fig. 5, the handle 54 is in the form of a loop having a pair of opposed short inwardly bent facing ends 56 which engage in the ends of the passageway 52. Thus, it is not necessary that the passageway 52 extend all the way through the cylindrical member 34. The handle 54 may swing about the axis defined by the ends 56, and is used to steady and support the percussive hammer 58 when the drilling is commenced. It is used also to oscillate the chuck and adapter with the shell 40 during the drilling process.

The shell 40 which is illustrated has hardened teeth 60 on its forward end and several fracture grooves 62 adjacent that end so that the shell may be expanded in its own hole for securement. Its hollow center can best be seen at 64 in Fig. 5. The particular shell 40 illustrated is intended to be driven into the masonary 50 and to have its tapered end 38 broken off by sudden lateral strain. This is normally done by merely forcing the hammer 58 downward after the shell 40 has been driven home. The annular fracture groove 66 provides a weakened area at which the fracture occurs.

According to the invention, all of the tool holders 30 are identical, regardless of the kind of percussive device with which the same are to be used, except for the size of the tapered socket 36. Every tool holder illustrated, therefore, has the identical construction, including those in Figs. 2, 3, 6, 7, 9, and 10. All of the tool holders 30 have the identical rear tapered socket 42 regardless of the size of the front socket 36, and this rear socket 42 is chosen of some standard and easily formed construction, fully capable of transmitting the desired impacts for any size of shell with which the tool holder may be used.

As previously explained, the adapter 32 is of a particular construction intended to be used with an electric hammer 58 of cooperative construction. The hammer as illustrated includes a structure for mounting the adapter which is described in considerable detail and claimed in said U.S. Patent 2,767,988, which is owned by the assignee of this application. There is a reciprocating plunger 68 which rapidly and repeatedly transmits blows to the impact end 74 of the shank 70 of the adapter 32. The shank 70 has an annular groove 72 spaced from the impact end 74, the axial length of which controls the stroke of the hammer, being confined in its reciprocating movement by the key 76. This key 76 is confined in a slot 78 formed in the tube 80 of the hammer and locked in place by telescopically slidable sleeve 82 which covers the same and is pressed against a stop ring 84 by the spring 86.

Adjacent its forward end the shank 70 has an annular groove 88 formed therein and said groove seats the annular lip 90 of a cup-shaped member 92. The member 92 is formed of some soft resilient material such as rubber or the like, and it is open toward the hammer 58, with its internal diameter being such that it engages upon the free end of the tube 80. It therefore provides a resilient and substantially dust-tight connection so that dust and debris cannot enter the tube 80 and cause damage to the parts of the hammer 58 by abrasion. The dust cap 92 may be considered a part of the adapter 32, although it is feasible to eliminate the dust cap 92 as illustrated in the adapter 32' at the bottom of Fig. 9.

Referring now to Fig. 9, the hammer 58 is diagrammatically illustrated at the bottom of the view, with its adapter 32' which, as explained, is identical in every respect to the adapter 32 but without the dust cap 92. As indicated by the arrow 94, the adapter 32 will fit all of the seven tool holders 30-A through 30-G, which are respectively provided with such end sockets as to operatively receive the shells 40-A through 40-G respectively. By reason of the construction described, the adapter 32' and the seven tool holders are all that the user needs to install seven different sizes of shells.

In Fig. 6 there is illustrated a chuck and adapter which comprises the identical tool holder 30 suitable for mounting the shell 40. The adapter in this case is different from the adapter 32 because it is intended to be used with a different construction of hammer. Thus, the adapter 100 has a rear shank portion 102 of elongate cylindrical structure with a short section 104 of greater diameter separated from the tapered male end part 44 by an annular collar portion 108. It is desired to emphasize that the dimensions of the tapered part 44 are identical to those of the tapered part 44 of the adapter 32 (and of all other adapters illustrated and described herein). This being so, obviously the adapter 100 will also fit into all of the tool holders 30-A through 30-G as illustrated in Fig. 9. The adapter 100 is illustrated second from the bottom in Fig. 9 and is intended to have its shank 102 fit into a certain type of hammer designated X. The arrow 106 leads to the tool holders.

Fig. 8 illustrates still another construction for an adapter 110 which differs somewhat from the adapter 100 in several dimensions. This adapter is to be installed on a still different type of hammer Y which requires, say, a smaller diameter shank 112 than the hammer X. The tapered end 44 is again identical to all others, and the tool holder 32 is also the same as those previously described.

In the same manner, other adapters such as 120 and 130 are constructed to fit other hammers such as Z and W but all will fit the same tool holders 30-A through 30-G and any others that may be made to receive different sizes of shells. In the event a new hammer comes on the market, the manufacturer merely makes a new adapter with the identical tapered end 44 and his problem is solved. This tapered end 44 may be described as a frustoconical formation.

Examining the illustrations, it will be seen that in every case the diameter of the tool holder 30 is substantially greater than the maximum diameter of the adapter. This enables the adapter to be made of metal stock which is much smaller in diameter than the stock from which the tool holders are made. The economies of this are quite substantial, since to make a chuck 10 as illustrated in Fig. 11 one must use stock whose diameter is at least as great as the diameter of the head portion 16.

Heretofore, self-drilling shells of the type which have the tapered end and illustrated at 38 in the figures have not been capable of being installed by hand. The only kind of shells which were installed by hand were those of the type illustrated in Figs. 7, 9 and 10 of U.S. Patent No. 1,392,703 which were required to be screwed upon a stud carried by a hand tool. The manufacture of this kind of tool was costly because the stud had to be able to withstand the impact, and had to be installed in the tool. Furthermore, the hand tool had to be continuously rotated in a single direction to prevent the shell from unscrewing and could not be oscillated on its axis. In addition, the debris became jammed into the shell interior, there being no escape path because of the presence of the stud. This prevented efficient cutting, and required the shell to be continuously withdrawn during the drilling operation for cleaning. Larger size shells could not be installed at all by this method.

Because of the invention, any and all of the tool holders 30-A through 30-G can be used to manually install any of the shells 40-A through 40-G. In Fig. 10 there is illustrated a tool holder 30 identical to those described being used to manually install a shell 40 in concrete 50. In place of an adapter and hammer, there is provided a bar 140 of substantial weight which may have a roughened gripping area 142 and a relatively malleable impact end 144 intended to receive the blows of a hammer head, partially illustrated at 146. The bottom end of the bar 140 is provided with a tapered male end 44 which is identical to the tapered ends 44 heretofore described. This construction enables the bar and hammer to perform substantially all of the functions performed by an adapter and pneumatic or electric hammer, but without the convenience of a power drive, of course. Since the identical tool holders are used, and the engagement of the end 44 in the socket 42 is tight, the bar 140 can be twisted back and forth while hammering its end to cause the formed hole to be smooth and true. The debris and cuttings come up the center of the shell and work out through the ejector passageway.

The tapered end 44 in every case is tightly engaged in a suitable socket 42 in a tool holder thereby enabling the necessary blows to be applied, and this can be done without peening or deforming the metal. The engagement is readily separated by any desired means since the axis of the tool holder 32 is hollow, and any suitable tool can be inserted with which to drive the tapered end 44 out of the socket 42, if desired. The handle 54 may be removed for manual use of the tool holder 30 by springing the loop apart.

It is desired to emphasize that the invention herein comprises a substantial improvement over the art that has existed in the field for a great length of time. The improvement herein consists of more than merely forming the chuck of the prior art into two parts where it was formerly an integral single part. It provides many advantages and functions which are not obvious and results in great economy and much greater utility than before. The nature of the self-drilling shell and the manner of installing the same give rise to conditions of transmission of impact, strength of materials, distortion and strain because of the manner of installation, and the like which are so peculiar to this art that the disclosures of other fields would not necessarily occur to or appear practicable or applicable by one skilled in this art.

It is believed that no further explanation is necessary, but it is desired to emphasize that variations in size and proportions and minor details can be made without in any way departing from the spirit or scope of the invention as defined in the appended claims.

What it is desired to secure by Letters Patent of the United States is:

1. A shell holder for holding the tapered end of a self-drilling, hollow, expansion shell while driving the same into masonry or the like, comprising a generally cylindrical member having a tapered socket at one end thereof coaxial with said cylindrical member for receiving the said tapered end therein, a transverse passageway extending through said cylindrical member at an angle relative the axis thereof and communicating with said tapered socket to provide egress for cuttings from said drill, and a second socket formed at the second end of said cylindrical member substantially coaxial therewith and adapted to receive a percussive male member therein for driving said shell as aforesaid.

2. A shell holder as claimed in claim 1 in which said second socket is tapered.

3. A shell holder as claimed in claim 1 in which a swingable handle is journalled on said cylindrical member.

4. A shell holder as claimed in claim 1 in which the first mentioned socket intersects said transverse passageway such that an ejector tool inserted into said passageway may be rotated to eject said shell.

5. Means for drivingly mounting a tapered end, hollow, self-drilling expansion shell upon a percussive drill which has a cavity for receiving and securing a particular tool formation therein, which comprises a pair of separable members, one being a shell holder and the other being an adapter, the shell holder having a tapered socket at one end for tightly receiving the tapered end of said shell therein and a second tapered socket at its second end, said adapter having a shank of said particular tool formation at one end thereof and a frusto-conical extension at the opposite end thereof tightly engageable with said second tapered socket, but readily removable therefrom, a transverse passageway in said shell holder communicating with said first tapered socket to provide egress for cuttings during the driving of said shell into masonry or the like, and a handle secured to said shell holder for directing said means and swinging the same during use thereof.

6. In combination, a chuck and adapter construction adapted for use in providing universal sets of tool holders for supporting and driving different sizes of hollow self-drilling expansion shells of substantially similar construction through the use of any one of a plurality of percussive drills of different tool-holding configurations, which comprises: a shell holder of generally cylindrical formation having a first tapered socket at one end thereof adapted telescopically to receive therein one end of one of said shells of a particular and conforming size and said shell holder having a transverse passageway communicating with the said first tapered socket for enabling insertion of a shell ejector tool therein but adapted for enabling the discharge of cuttings from the center of said shell therethrough while driving said shell, an adapter member, one end of said adapter member and the second end of said shell holder having complementary coupling means holding same operatively connected together but readily separable one from the other, said adapter having a configuration at the second end thereof adapted complementarily to engage with the tool-holding configuration of a particular one of said percussive drills whereby to enable said particular one drill to be used to drive said one shell, but the said one end of said adapter being suitable for identical said operative connection with other similarly constructed shell holders for driving other sizes of shells with the same adapter and drill, and the said second end of said one shell holder being suitable for identical said operative connection with other similarly constructed adapters having other configurations respectively at the second ends thereof to enable other drills and adapters to be coupled to said one shell holder.

7. A structure as claimed in claim 6 in which said complementary means comprise male and female parts.

8. A structure as claimed in claim 6 in which said complementary means comprise a second tapered socket formed in the second end of said shell holder and coaxial with said first tapered socket, and a tapered extension formed on said one end of said adapter and telescopically engaged in said second tapered socket.

9. A structure as claimed in claim 6 in which there is a handle journally transversely of said shell holder for axially swinging said shell holder during driving of shells therewith.

10. In combination, a chuck and adapter set standardized for universal use with any one of a series of hollow, self-drilling expansion shells of like construction each having one end thereof required to be coupled to a source of percussive power for driving the opposite end of the shell into an anchoring surface, said ends of the shell required to be so coupled varying in size one relative the other, said set comprising a series of shell holders of generally cylindrical formation each having a socket at one end thereof adapted to be telescopically engaged with said one end of a shell of said series, each holder having a normally open transverse passageway communicating with the socket for operative insertion of a shell ejector tool therein, and an adapter member having opposed ends of which one end has means extending axially outward for coupling with said source whereby power from the source can be applied to said adapter member to be translated to said one end of the shell, the opposite end of each shell holder and adapter member having complementary readily separable coupling means of substantially identical construction whereby each shell holder of said series may be operably associated with said adapter member regardless of the size of shell to be anchored.

11. In combination, a chuck and adapter set standardized for universal use with a hollow, self-drilling expansion shell having one end thereof required to be coupled to a source of percussive power for driving the opposite end of the shell into an anchoring surface, said set comprising, a shell holder of generally cylindrical formation having a socket at one end thereof adapted to be telescopically engaged with said one end of the shell, said holder having a normally open transverse passageway communicating with the socket for operative insertion of a shell ejector tool therein, and a series of adapter members each having opposed ends of which one end has means for coupling said adapter member with said source whereby power from the source can be applied to said adapter member to be translated to the said one end of the shell, each adapter member of the series having said means of a character different than that of its companions of the set whereby each of the adapter members of the set can be coupled to a different source, the opposite end of the shell member and each adapter member having complementary readily separable coupling means of substantially identical construction whereby each adapter member of the set can be operably associated with the shell member.

12. A shell holder as claimed in claim 1 in which there is a hollow bore formed in the said cylindrical member connecting said tapered and second sockets.

References Cited in the file of this patent

UNITED STATES PATENTS

| | | |
|---|---|---|
| 1,138,877 | Lelois | May 11, 1915 |
| 1,325,982 | Dougherty | Dec. 23, 1919 |
| 1,775,917 | Rudlin | Sept. 16, 1930 |
| 1,863,107 | Glenzer | June 14, 1932 |
| 2,425,988 | Brisben | Aug. 19, 1947 |
| 2,556,263 | Fiorini | June 12, 1951 |
| 2,767,988 | Dieterich et al. | Oct. 23, 1956 |
| 2,805,073 | Fletcher | Sept. 3, 1957 |